(12) United States Patent
Douglis et al.

(10) Patent No.: US 7,325,034 B2
(45) Date of Patent: Jan. 29, 2008

(54) METHOD AND APPARATUS FOR SCALABLE PEER-TO-PEER INQUIRIES IN A NETWORK OF UNTRUSTED PARTIES

(75) Inventors: Frederick Douglis, Basking Ridge, NJ (US); Frank L. Jania, Norwalk, CT (US); Jason D. LaVoie, Mahopac, NY (US); John Michael Tracey, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 10/670,138

(22) Filed: Sep. 24, 2003

(65) Prior Publication Data

US 2005/0065632 A1    Mar. 24, 2005

(51) Int. Cl.
*G06F 15/16* (2006.01)
*H04Q 7/00* (2006.01)

(52) U.S. Cl. .................. 709/205; 709/207; 709/206; 709/224; 370/312

(58) Field of Classification Search .................. None
See application file for complete search history.

(56) References Cited

U.S. PATENT DOCUMENTS 3,701,107 A * 10/1972 Williams .................. 711/133

(Continued)

OTHER PUBLICATIONS

ICT Broadcast Suite: SkillTap. [online]. IBM [retrieved on Jan. 11, 2007]. Retrieved from the Internet: <URL:http//community.ngi.ibm.com/skilltap.htm>.*

U.S. Appl. No. 10/207,711, Goodman et al., Interactive Filtering Electronic Messages Received from a Publication/Subscription Service, Jul. 26, 2002.

*Primary Examiner*—Patrice Winder
*Assistant Examiner*—La Juania N Mouzon
(74) *Attorney, Agent, or Firm*—Duke W. Yee; Mark Wardas; Lisa L. B. Yociss

(57) ABSTRACT

A method and apparatus for scalable inquiries in a network of communicating peers are provided. The method and apparatus of the present invention make use of communal filters and randomization to determine which client devices will output a message that is to be broadcast to a community of client devices. Each message is assigned a probability value that is determined based on various criteria or may be determined randomly. The message is then transmitted to the client devices who apply their own respective display criteria to the message parameters to determine if the message is one that is of interest to the user of the client device. If the message is not of interest to the user of the client device, the message is discarded. If the message is of interest to the user, logic is applied to the parameters of the message to determine whether the message should be displayed to the user or not. This logic may involve determining whether the message has been previously displayed to the user, whether the message has been received but not previously displayed, and the like. In addition, if the message has not been previously displayed to the user, a randomly generated number, which may be weighted based on other criteria, is generated and compared with the probability value associated with the message. Based on this comparison, the message is either displayed or not displayed on the client device. This probability value of the message may be adjusted with each subsequent rebroadcast of the message to increase the size of the subset of users that will see the message.

15 Claims, 9 Drawing Sheets

U.S. PATENT DOCUMENTS

| | | | |
|---|---|---|---|
| 5,541,996 A * | 7/1996 | Ridenour | 380/46 |
| 5,888,136 A * | 3/1999 | Herbert | 463/22 |
| 5,978,566 A * | 11/1999 | Plank et al. | 709/206 |
| 6,014,644 A * | 1/2000 | Erickson | 705/37 |
| 6,072,942 A * | 6/2000 | Stockwell et al. | 709/206 |
| 6,161,130 A * | 12/2000 | Horvitz et al. | 709/206 |
| 6,330,610 B1 * | 12/2001 | Docter et al. | 709/229 |
| 6,415,243 B1 * | 7/2002 | Mann | 702/181 |
| 6,424,997 B1 * | 7/2002 | Buskirk et al. | 709/206 |
| 6,535,586 B1 * | 3/2003 | Cloutier et al. | 379/88.13 |
| 6,646,988 B1 * | 11/2003 | Nandy et al. | 370/235 |
| 6,816,878 B1 * | 11/2004 | Zimmers et al. | 709/200 |
| 6,922,722 B1 * | 7/2005 | Mann et al. | 709/220 |
| 7,194,249 B2 * | 3/2007 | Phillips et al. | 455/404.1 |
| 2001/0043677 A1 * | 11/2001 | Takeda et al. | 379/67.1 |
| 2003/0041146 A1 * | 2/2003 | Davis et al. | 709/227 |
| 2003/0055768 A1 * | 3/2003 | Anaya et al. | 705/36 |
| 2004/0225718 A1 * | 11/2004 | Heinzel et al. | 709/206 |
| 2005/0021649 A1 * | 1/2005 | Goodman et al. | 709/207 |
| 2005/0129346 A1 * | 6/2005 | Chen et al. | 385/11 |

* cited by examiner

METHOD AND APPARATUS FOR SCALABLE PEER-TO-PEER INQUIRIES IN A NETWORK OF UNTRUSTED PARTIES

BACKGROUND OF THE INVENTION

1. Technical Field

The present invention is generally directed to an improved data processing system. More specifically, the present invention is directed to a method and apparatus for scaling inquiries in a network of communicating peers.

2. Description of Related Art

Peer-to-Peer communication in a computer network may take many different forms including media sharing, instant messaging, chat rooms, interactive communities, and the like. One form of interactive community is a "one-to-many" request-response type system in which individuals may ask many users simultaneously for an answer to a question and then receive responses in the form of one-to-one instant messaging, N-to-N chat rooms, or summaries in the form of a poll. That is, a user may generate a message and have that message broadcast to a large group of users.

A drawback to such "one-to-many" request-response type systems is that all active users may receive all queries, even those deemed "inappropriate" uses of the system or that can be answered by just one person or relatively few people. It can be seen that if the community of users is in the hundreds or thousands, as in most communities of this type, and each user may generate a message and broadcast it to each other user, the number of messages being exchanged can be quite numerous. Each such message may cause an interruption in the recipient user's use of his/her computing device, e.g., due to a pop-up window or the like. This may lead to frustration on the part of the user because the user will be inundated with messages, the majority of which may be of no interest to the user or may no longer be relevant due to responses the originator of the message received from other users. Thus, it would be beneficial to have a method and apparatus for scaling inquiries in a network of communicating peers in order to minimize the disruption and consequent frustration of the user.

SUMMARY OF THE INVENTION

The present invention provides a method and apparatus for scalable inquiries in a network of communicating peers. The method and apparatus of the present invention make use of communal filters and randomization to determine which client devices will output a message that is to be broadcast to a community of client devices. Each message is assigned a probability value based on various criteria or may be determined randomly. The message is then transmitted to the client devices, which apply their own respective display criteria to the message parameters to determine if the message is potentially one of interest to the user of the client device. If the message is not potentially of interest to the user of the client device, the message is discarded.

If the message is potentially of interest to the user, logic is applied to the parameters of the message to determine whether the message should be displayed to the user. This logic may involve determining whether the message has been previously displayed to the user, whether the message has been received but not previously displayed, and the like. In addition, if the message has not been previously displayed to the user, a randomly generated number, which may be weighted based on other criteria, is generated and compared with the probability value associated with the message. Based on this comparison, the message is either displayed or not displayed on the client device. This probability value of the message may be adjusted with each subsequent rebroadcast of the message to increase the size of the subset of users that see the message.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
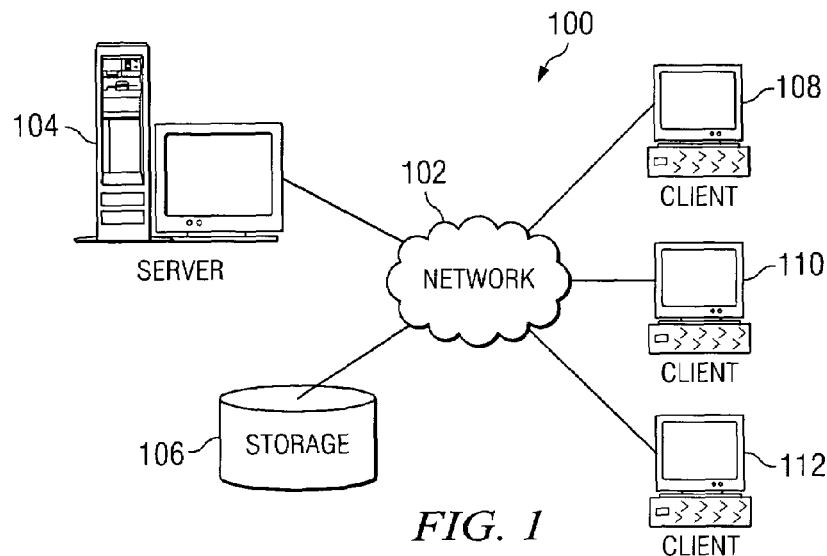
FIG. 1 is an exemplary block diagram of a distributed data processing system in which the present invention may be implemented.
Figure 2:
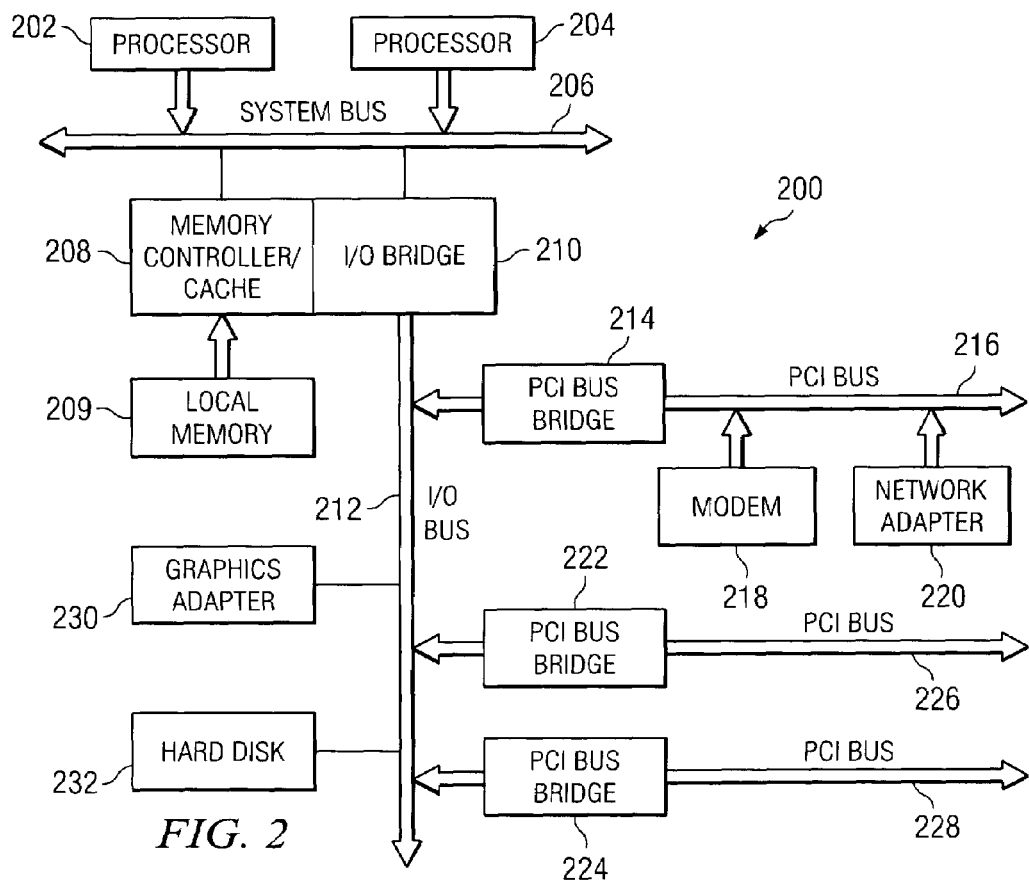
FIG. 2 is an exemplary block diagram of a server computing device in which aspects of the present invention may be implemented.
Figures 3, 4:
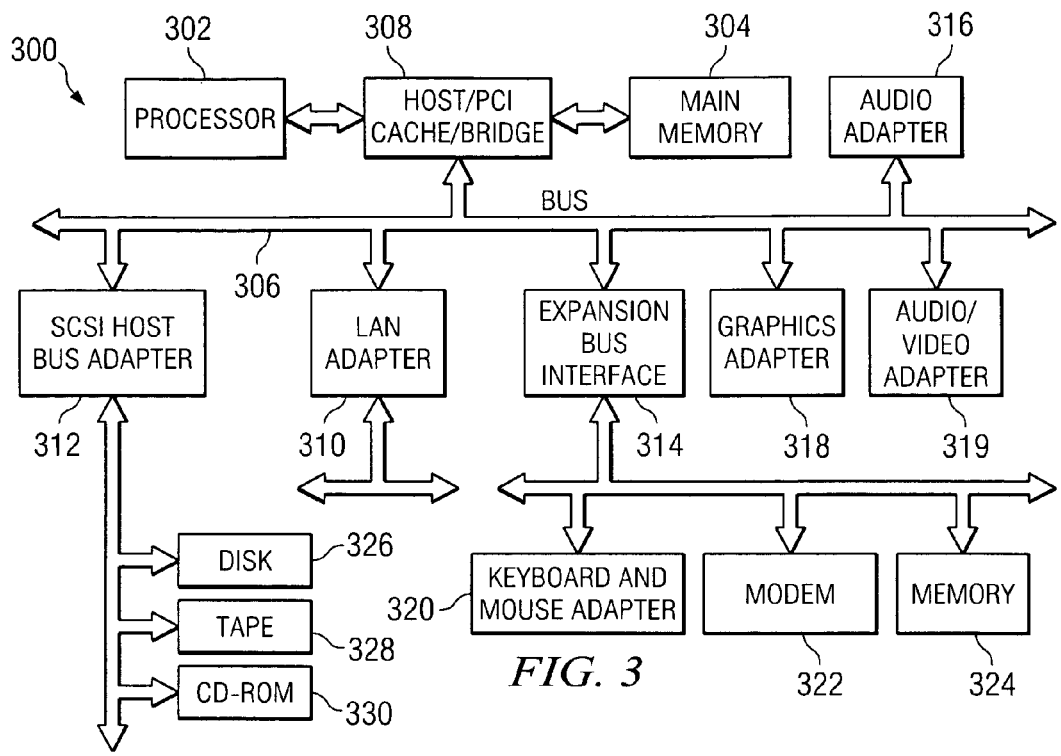
FIG. 3 is an exemplary block diagram of a client computing device in which aspects of the present invention may be implemented.
FIG. 4 is an exemplary diagram of a PollCast query according to the IBM Community Tools with Broadcast Suite tool.

The present invention is directed to a method and apparatus for scaling inquiries in a network of communicating peers. Therefore, the present invention is especially suited for use with a distributed data processing system in which client computing devices may communicate with other client devices on a peer-to-peer basis with the aid of services offered via one or more server computing devices. Thus, the following FIGS. 1-3 are intended to provide a context for the description of the specific elements of the present invention. Aspects of the present invention may be implemented in one or more server and/or client computing devices, such as those shown in FIGS. 1-3, as discussed hereafter.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or Linux operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as WINDOWS XP, which is available from Microsoft Corporation. An object oriented programming system such as JAVA may run in conjunction with the operating system and provide calls to the operating system from JAVA programs or applications executing on data processing system 300. "JAVA" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously mentioned above, the present invention is directed to improving a network of communicating peers, such as the distributed data processing system illustrated in FIG. 1. In a network of communicating peers, users may communicate with each other via their client devices, such as the one shown in FIG. 3, and also may make use of the aid of services offered via one or more server computing devices, such as the one shown in FIG. 2. Through such a network of communicating peers, users may send messages to one another, media files, and the like.

One exemplary communication network, which will serve as the basis for the description of the present invention, makes use of the "IBM Community Tools with Broadcast Suite" (hereafter referred to as ICT) tool. ICT allows users to communicate with each other, along the lines of instant messaging, to obtain feedback on various topics. ICT is not a true "peer-to-peer" network in the sense that Napster, Morpheus, Kazaa, and many other file-sharing networks are, because all communication between clients goes through one or more servers; however, communication is logically peer-to-peer because each client can interact with other clients without moderation or explicit authorization. While ICT will be used as the basis for the present description of the preferred embodiments of the present invention, it should be appreciated that the mechanisms and functions of the present invention are not limited to ICT and may be used with any network that allows for a one-to-many type of communication.

ICT is a suite of applications for interacting with various communities through instant and broadcast messaging. The power of client-side-filtered broadcast messaging is exploited to allow users to locate subject matter experts, start impromptu discussions, and alert and survey large groups of people instantly, all in real time. The Broadcast Suite of ICT allows users to use publish-subscribe technology to send messages to a large group of users in a community. With Broadcast Suite, a suite of applications allows for various types of communications between users of a community. These applications include Freejam, SkillTap, PollCast, TeamRing, and w3alert. Freejam allows a user to instantly initiate a just-in-time chat room for discussion of any topic. The chat room lasts for as long as the discussion continues and is abolished once the discussion ceases. SkillTap allows a user to send out a message requesting assistance on a particular matter. Other users may respond to the request and initiate an instant messaging session in which they share their expertise on the particular matter. PollCast allows a user to initiate a poll of the users in the community regarding a particular issue. The results of the poll are accumulated and presented to the originator of the PollCast, as well as each respondent, in real-time. TeamRing allows a user to share a presentation between a plurality of users in the community. The w3alert allows an alert message to be sent to all of the currently on-line users in the community.

Some aspects of the ICT and Broadcast Suite are described in co-pending and commonly assigned U.S. patent application Ser. No. 10/207,711, entitled "Interactive Filtering Electronic Messages 20 Received from a Publication/Subscription Service", filed on Jul. 26, 2002, published on Jan. 29, 2004 as U.S. patent application Publication 2004/00 19645A1, and hereby incorporated by reference.

With each of these tools, other users in the community are invited to respond to a user's message by means of an alert that is displayed on the other users' computer displays. The alert is typically displayed for a few seconds or until dismissed. Thus, the alert causes an interruption in the users' use of their computers. Unfortunately, the ICT tools have suffered from a high rate of "spurious interrupts" as the size of the user community has steadily increased. To illustrate the potential for problems due to these "spurious interrupts", the following is a brief explanation of how a user may make use of ICT and Broadcast Suite to communicate with users of a particular community.

Individuals make use of ICT by subscribing to a list of "communities." One community, called "everyone", is the catch-all community to which virtually everyone using ICT subscribes. One may select a more focused community to send alerts only to users who have explicitly subscribed to a particular topic. These communities include specific subject matter, such as JAVA programming, specific locations such as users in a given locale, or miscellaneous topics such as "water cooler" (meaning non-work-related).

In addition to communities of interest, users may filter alerts by content. A user may specify that only alerts containing specific keywords should be displayed, or that all messages except those containing specific keywords should be displayed.

Figure 5:
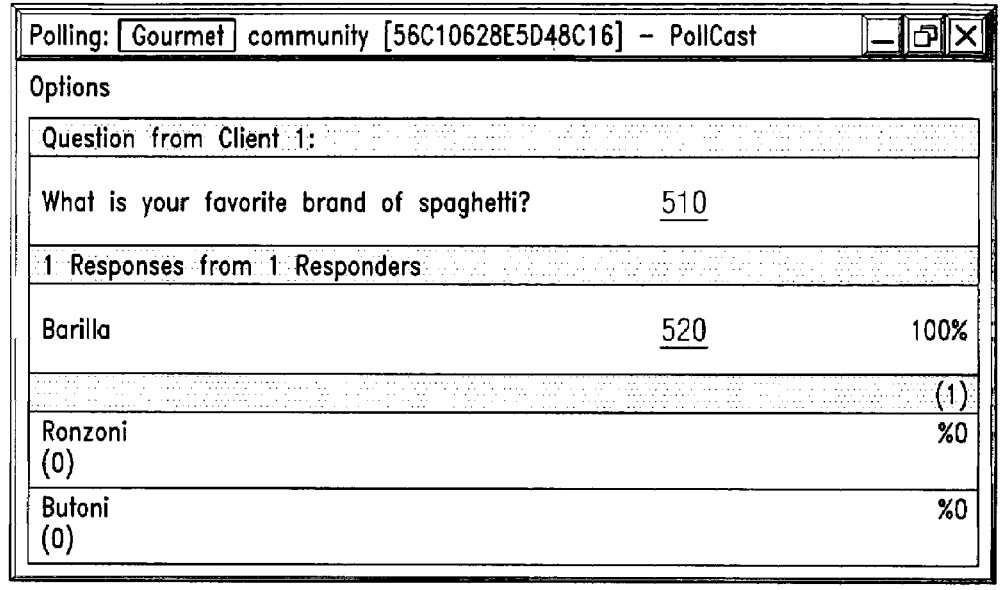
FIG. 5 is an exemplary diagram of a response to a PollCast query according to the IBM Community Tools with Broadcast Suite tool.

To initiate a broadcast, a user invokes a form, specifying a community of interest, and a message. For PollCasts, the user specifies the possible responses (yes/no, multiple choice, free form), and then responses are tallied and displayed to the originator and anyone who responds. An example PollCast query is illustrated in FIG. 4. As shown in FIG. 4, a first field 410 is provided for entry of a survey question, a second field 420 is provided for selection of a type of response, a third field 430 is provided for entry of the possible answers, if multiple choice is selected, and a fourth field 440 is provided for entry of a time limit on the survey. FIG. 5 provides an exemplary diagram of a response that is received by the originator of the PollCast from the community. As shown in FIG. 5, the response includes a field 510 for identifying the survey question and a field 520 for indicating the possible answers and the statistics as to the responses received from users within the community that chose to respond.

For SkillTap, respondents initiate one-to-one instant messaging sessions with the originator. To make sure that the originator is not inundated with responses, software on the responders communicates with a central service, registering its intent to respond, and terminating if the number of previous responders is above a threshold.

While ICT has a central server that acts as a clearing-house, the central server does not have current knowledge of which users are active at any time, what communities they subscribe to, or what keywords they filter. Instead, all alerts are sent over a publish-subscribe infrastructure, allowing subscribers to apply their own rules to the messages they receive.

Figure 6:
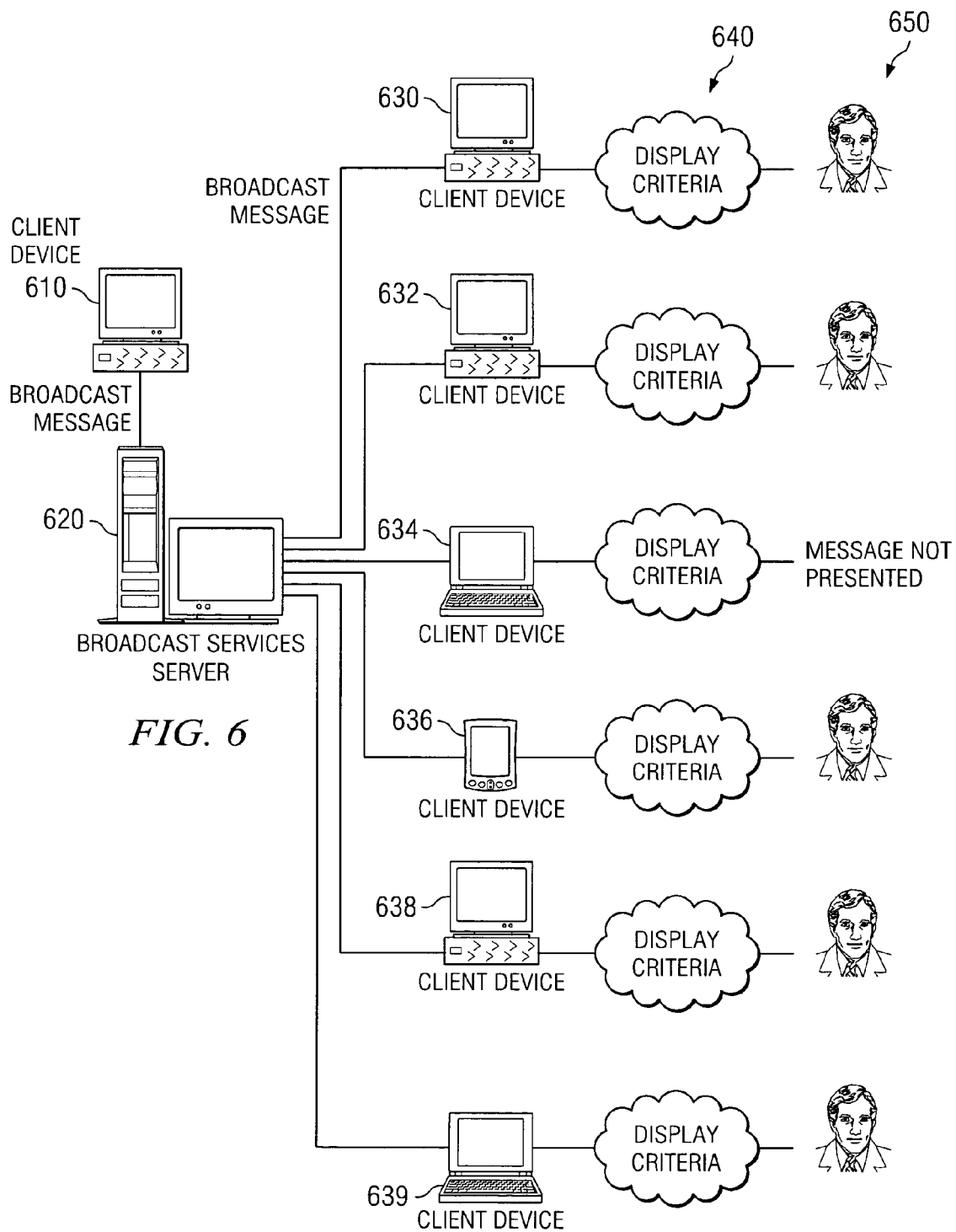
FIG. 6 is an exemplary illustration of this publish-subscribe infrastructure illustrating the selective display of messages according to one exemplary embodiment of the present invention.

FIG. 6 is an exemplary illustration of this publish-subscribe infrastructure. As shown in FIG. 6, a client device 610 sends a broadcast message over a selected channel, e.g., to a selected community, to a broadcast service resident on a server 620 that is part of the publish-subscribe infrastructure. The message is broadcast to each of the client devices 630 that have chosen to subscribe to the channel, e.g., chosen to be part of the community, over which the message was broadcast. Each client device 630 applies its own display criteria 640 to the broadcast message to determine whether the message is to be displayed at the client device so that the associated observer 650 may view the message.

Users are willing to participate in such a system for many of the reasons they use other systems such as networks, news groups, mailing lists, and the like, i.e., they feel they may be able to help themselves and others, they feel they learn something by seeing the questions and responses generated by others, and they realize that no one will receive information without willing volunteers providing it. However, they may be unwilling to participate in certain aspects of such a system if they find the alerts too distracting. That is, users may disable the ICT system to prevent excessive interruptions from alerts.

While the check on the number of responders in a SkillTap broadcast protects the originator from too many responses, the user community is not protected from too many inquiries from other users. As the number of users of the ICT system increases, there are more pop-up alerts simply due to the increasing number of users posting inquiries. A community that gets one alert per day with a small number of users might get one alert per minute with a large user base. In fact, a side effect of a growing user population is that many users ask trivial PollCast or SkillTap questions merely as a way to try out the system without thinking about how many users they are intruding upon.

Furthermore, the impact of an alert varies depending on many criteria. Assuming that a user will willingly field a query asking for technical assistance, or a poll asking useful and unique information, there are numerous anecdotal examples of queries that should not be sent to all users, or perhaps to none at all. Examples of these inappropriate messages fall into the following categories of unacceptable content: SkillTap queries that are easily answered through other means, repeated queries, clusters of alerts, and questions where one answer suffices. Further examples of unacceptable content are content that can be considered harassing or offensive, content that is not business related in a business-only community, and the like. An example of a SkillTap query that may be easily answered through other means is a query asking what a particular acronym means. This question could be easily answered through an on-line search engine search such as Google™.

Certain questions, such as "How does one add a new community?" may appear repeatedly, for instance every few days. The answers to such questions may be available in a Frequently Asked Questions (FAQs) list, but the questioner has not consulted it. Certain polls, such as "What country are you in?" also repeat frequently. Such frequently repeated queries should be avoided in order to limit the number of alerts sent to client devices.

On numerous occasions, one poll gives rise to several related polls in a short time. For example, a user may wish to rephrase a poll by, for example, adding an additional allowable response, rewording the question, or the like. In addition, related polls may ask questions regarding the suitability of the original poll. Such related polls cause a cluster of alerts to be displayed on user client devices, causing much interruption and frustration of the users participating in the community. Such clusters of alerts should be avoided.

While the above examples of PollCasts and SkillTaps describe cases where an alert was not appropriate at all, sometimes a query is appropriate, but not everyone in the community should see the query. For example, the limit on the number of SkillTap responses prevents the originator of the SkillTap query from being overloaded, but frustrates anyone who not only sees the alert but agrees to respond to it, only to have the response suppressed because others already replied to it.

The present invention addresses these problems, and others, associated with logical peer-to-peer networks, such as ICT, by limiting the number of users impacted by a particular alert. The limiting of the number of users impacted is performed based on various criteria and may make use of mechanisms such as pseudo-randomized selection of users to which the alert is sent, communal filtering, a graduated increase in the size of the community to which an alert is sent, and the like. In this way, the number of alerts any one user in a community receives is lessened so that the level of interruption and frustration of the user is diminished.

Figure 7:
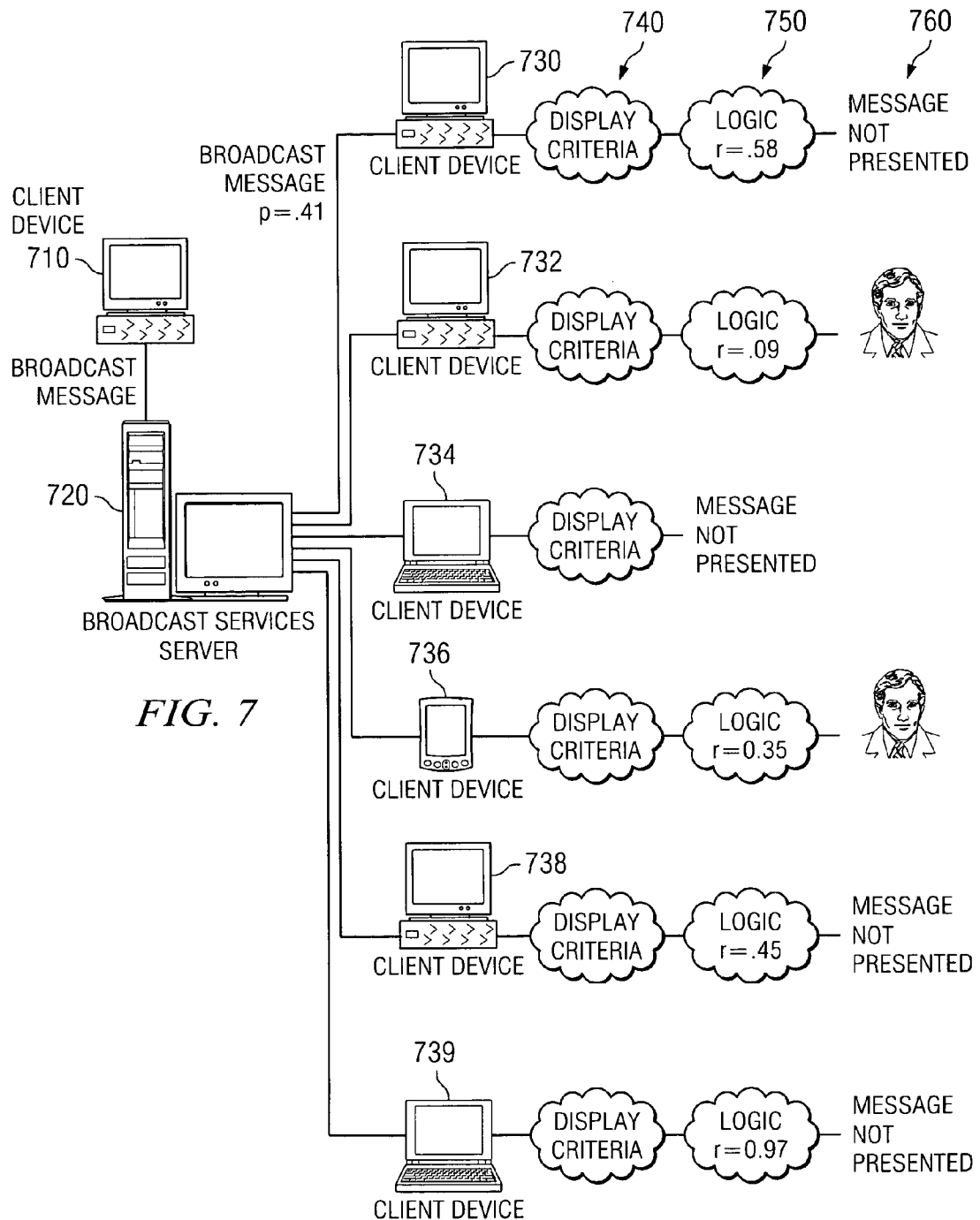
FIG. 7 is an exemplary diagram illustrating the sending of alerts to client devices in accordance with an exemplary embodiment of the present invention.

FIG. 7 is an exemplary diagram illustrating the sending of alerts to client devices in accordance with an exemplary embodiment of the present invention. In the depicted example, when a client device 710 generates a message for broadcast to users of a community, e.g., a PollCast or SkillTap message, the generated message is received by a broadcast services server 720. The broadcast services server 720 assigns a probability value to the message and then transmits it to each user's client device 730-739 in the designated community. Based on the probability p associated with the broadcast message, display criteria 740 established by each of the client devices 730-739, and logic 750 for determining whether to display a received message, the received message is either output for viewing by the user 760 or it is not output.

The assignment of a probability value p to the broadcast message by the broadcast services server 720 may be determined in a number of different ways. In one exemplary embodiment, the probability p may be determined randomly. That is, each message that is received for broadcast by the broadcast services server 720 may have its probability value determined from a random probability value generation algorithm. The randomly generated probability value p may then be assigned to the broadcast message along with a message ID. The probability value p, message ID, and content of the message may be stored in a data structure of the broadcast services server 720 temporarily until the handling of the broadcast of the message is complete, as discussed in greater detail hereafter. The message is then sent to each of the client devices 730-739 associated with the community to which the message is to be broadcast. The broadcast of the message includes the sending of the message ID and probability value p which may then be used by the client devices 730-739 to determine whether to display the broadcast message or not, as discussed hereafter.

Alternatively, the probability value p may be based on characteristics of the originator of the message, characteristics of the message being sent, characteristics of the community to which the message is to be broadcast, and the like. For example, the broadcast services server 720 may automatically assign a low priority value, e.g., 10%, to messages received from new users, e.g., the first N message broadcasts received from any user may be assigned a probability of 10% while the N+1 message may be assigned a higher probability value of 20%, or the like. Similarly, established users may have their default probability values set based on their status as established users, and these probability values may be modified based on the number of messages broadcast by the user.

In another example, the type of message and/or the community to which the message is to be broadcast may have established probability values or probability values determined based on current conditions. For example, if the message is regarding a particular topic or makes use of certain keywords, the probability may be set to a particular value that has been established for that topic or set of keywords. In addition, a community may have an established probability value or values to be used with messages.

In addition, the size of the community may be used as a mechanism for determining the probability value to be assigned to broadcast messages. That is, smaller communities may have higher probabilities assigned to broadcast messages since the number of users is small and thus, the source of alerts is relatively small. On the other hand, large communities have a much larger number of sources of alerts, and thus, the probabilities associated with broadcast messages may be made lower in order to reduce the number of alerts provided to the users of the community. These probabilities may be based on the current number of users that are actively receiving broadcasts to a community or may be based on the overall size of the community.

The above are only exemplary embodiments for assigning a probability to the broadcast messages received by the broadcast services server 720. Other criteria and mechanisms for assigning a probability value to the broadcast message may be used without departing from the spirit and scope of the present invention.

Regardless of the particular mechanism or criteria used to determine the probability value to be assigned to the broadcast message, the broadcast services server 720 stores a message ID for the message, the probability value p for the message, and the contents of the message in a temporary data structure that is maintained by the broadcast services server 720 until processing of the broadcast message is complete. This may involve rebroadcast of the message to the users of the community prior to completion of the processing of the broadcast message, as discussed hereafter. The message, along with the message ID and probability value p are broadcast to each client device 730-739 that is a subscriber to the community to which the broadcast message is broadcast.

At each of the client devices 730-739, the client device applies its own display criteria 740 to the received message. This display criteria 740 may include, for example, which communities the client device 730-739 subscribes to, which keywords are to be included or suppressed, or the like. If the message does not pass the display criteria application, for example, the message is not for a community to which the client device 730-739 subscribes or contains keywords that are to be suppressed, then the message is not displayed to the user 760 of the client device 730-739. If the message does pass the display criteria, then a further filtering of the message is performed to determine whether to display the message to the user 760 of the client device 730-739.

This further filtering involves a comparison of the probability value p associated with the message and a randomly generated probability value r for the client device, e.g., client device 730. In particular, when the message is received, a determination is made as to whether a message with the same message ID has already been received. For example, the message ID associated with the received message is compared to a log of the messages received during a current session to determine if the message has been previously received by the client device 730. If the message has not been previously received by the client device 730, then a randomly generated probability value r is calculated ($0<=r<=1$).

The probability value r may be generated purely randomly or may be generated or weighted based on other criteria. For example, the r value may be randomly generated and then modified based on the number of messages displayed on the client within a predefined period of time. That is, if a client device is the victim of a PollCast storm; i.e., a large number of PollCasts being displayed within a short period of time, then the value of r may be increased so as to lessen the likelihood that the current message will be displayed. With such an embodiment, the client device may maintain a count of the number of messages displayed within a predetermined period of time and this count may be used to weight the randomly generated probability value r. In this way, the number of alerts displayed on client devices in the large community is reduced while the number of alerts in the smaller community is not modified or is lowered so as to increase the likelihood that everyone in the small community sees every alert.

In yet another embodiment, the r value may be calculated or weighted based on the user's display criteria. For example, the user may indicate that he/she always wants messages with a particular subject matter X to be displayed yet messages with subject matter Y should only be displayed occasionally and messages with subject matter Z should not be displayed at all. Based on these display criteria, messages with a subject matter X will have an r value weighted more heavily than messages having other subject matter. Messages with a subject matter Y will have moderate weighting while messages with subject matter Z may have a weighting that renders them non-displayable.

In other embodiments of the present invention, the r value for the client device may be calculated or weighted based on the type of client device. For example, if the client device is a mobile device, e.g., a personal digital assistant (PDA), a laptop computer, a mobile telephone, or the like, the r value may be weighted so as to discourage the display of messages on this type of client device. This may be desirable because mobile devices tend to be less well connected to the system, have battery power limitations, and the like. Thus, characteristics of the client device may also be used as a basis for calculating or modifying the calculation of the r value for the client device.

There are many different ways that the r value for logic in the client device may be calculated and not all of them can be explained in detail within this disclosure. However, the scope of the present invention encompasses any manner by which the p value and r value may be calculated.

Once the r value is determined, a comparison of the r value to the p value of the message is made. If $p>=r$, then the client device 730 displays the message as an alert, such as in the current ICT system. In addition, the client device 730 stores the message ID for the message in a session log for the current session along with an indicator to identify the message ID as being associated with a message that has been displayed on the client device 730. Later broadcast messages with the same message ID may be ignored since the message has already been displayed to the user of the client device 730.

If $p<r$, then the message is not displayed to the user via the client device 730. The client device still stores the message ID for the message but also stores the calculated r value and an indicator that the message was not displayed on the client device 730.

If, when the message is received by the client device 730, it is determined based on the comparison of message ID to the session log that the message has been previously received by the client device, a determination is made as to whether the message has been previously displayed to the user. That is, the entry in the session log is read to determine if there is an indicator identifying the message as having been displayed previously. If the message has been previously displayed, the currently received message is discarded as a duplicate message.

If the message was previously received by the client device 730 but not displayed, i.e., the entry in the session log includes an indicator identifying the message as having not been displayed, then the stored value of r in the session log entry for this message ID is compared against the value of p for the currently received message. If the message is a duplicate of a previously sent message, it is likely that the p value is different from the p value of the previously sent version of the message since one embodiment of the present invention involves increasing the p value with each broadcast of the message to thereby gradually increase the number of users that will have the message presented or to target a new set of users within the community that may not have seen the message during the first broadcast of the message. Thus, if a first broadcast of a message is sent out with a p value of 0.41 and it is determined that an adequate response to the message has not been received, then the message may be rebroadcast with a higher p value, e.g., p=0.75, in order to increase the likelihood that an adequate response is received. The term "receiving a response" as used in the present application is broad enough to cover the detection and actual reception of an adequate response and/or the detection of the absence of such adequate response.

The reason the "old" r value stored in the session log entry for the corresponding message ID is used, rather than calculating a new r value for each rebroadcast of the same message, is to have a consistent notion of probability: if the value of p goes from 0.2 to 0.5, then the goal would be to have half the client devices display the query, not to have half of the remaining 80% of the devices display it. That is, using a new value of p=0.5 and a new random value for r, (0.2+(0.5*0.8)=0.6) of the client devices will display the message across the two phases. Of course, the new value of p can be adjusted to account for the original value, allowing client devices to compute a new random number with the same net effect. Thus, either approach is viable and is intended to be within the scope of the present invention.

Thus, as shown in FIG. 7, assuming this is the first time the message has been broadcast, client device 730 applies the display criteria 740 to the broadcast message and determines that the message meets the display criteria 740 for client device 730. Next, logic 750 is applied to the broadcast message to determine if the message should be displayed to the user 760. An r value is randomly generated to be r=0.58 and a comparison of this r value to the p value of the message is made. Since r is greater than p, the message is not displayed to the user 760.

With regard to client device 732, the display criteria 740 for this client device 732 is applied to the broadcast message when it is received and a determination is made that the broadcast message meets the requirements of the display criteria. Next logic 750 for the client device 732 is applied to the broadcast message. A randomly generated r value of 0.09 is compared against the p value of 0.41 of the broadcast message, and a determination is made to display the message to the user 760 since the r value is less than the p value.

Regarding client device 734, when the broadcast message is received by client device 734, the display criteria 740 for this client device is applied to the broadcast message to determine if the message should be displayed. Based on the display criteria 740, a determination is made that the broadcast message does not meet the display criteria, e.g., the client device 734 does not subscribe to the community to which the message is intended or the broadcast message contains keywords that are to be suppressed, and thus, the message is not displayed to the user 760. The other client devices 736-739 perform similar filtering of broadcast messages. In those cases where the message is displayed, a session log entry is generated with the message ID and an indicator that the message was displayed. In those cases where the message was not displayed, a session log entry is generated with the message ID, the r value that was generated, and an indicator that the message was not displayed.

Figure 8:
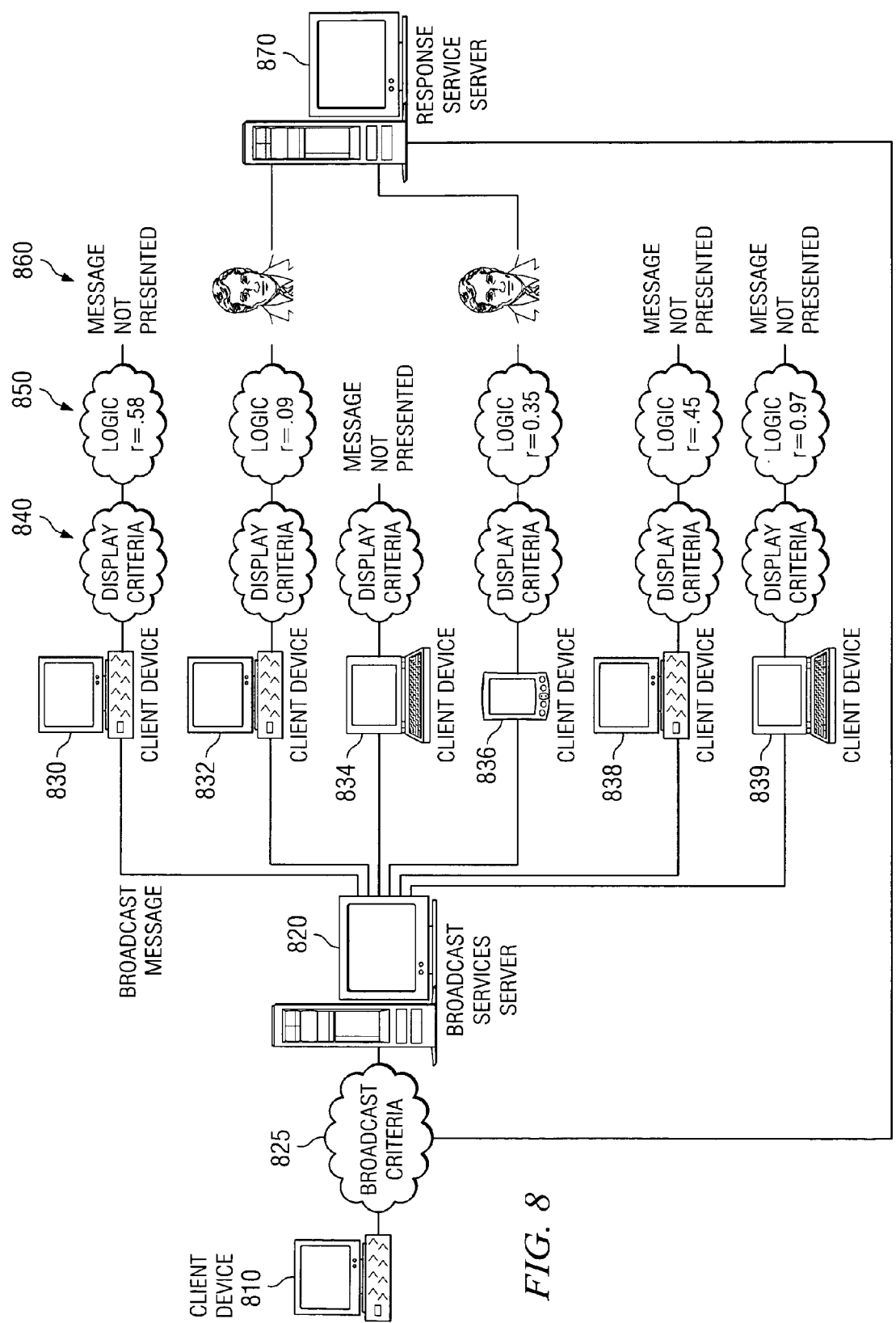
FIG. 8 illustrates an embodiment of the present invention in which the broadcast services server receives feedback from the users of the client devices and uses this feedback to determine how to rebroadcast the message.

FIG. 8 illustrates an embodiment of the present invention in which the broadcast services server receives feedback from the users of the client devices and uses this feedback to determine how to rebroadcast the message. In this embodiment of the present invention, the broadcast services server 820 receives a message for broadcast from the client device 810. The broadcast services server 820 applies broadcast criteria 825 to the received message to determine the parameters for the broadcast of the message, e.g., the p value, the community, etc. The broadcast services server 820 stores a copy of the message along with the message ID assigned to the message and other state parameters, e.g., p value, community identifier, number of responses from client devices, number of required responses from client devices, and the like, in order to allow the broadcast services server 820 to rebroadcast the same message on multiple occasions but with different parameters. For example, the broadcast services server 820 may send the first N PollCasts from any given client device with a specification that tells each client device to display the message with a low probability, such as 10%, but use a higher default for "established" users.

With this embodiment of the present invention, the message may be displayed on client devices 830-839, assuming that the message passes the application of the display criteria 840 and the logic 850, such that a user may enter feedback regarding whether the message should be suppressed or should be broadcast to other users. The input from the user 860 is provided to a response service server 870 which provides the responses to the broadcast services server 820. The broadcast services server 820 uses the responses received to provide information to the client device 810, e.g., PollCast results, etc., as well as determine if and how to rebroadcast the message.

For example, if a number of users 860 respond indicating that the message should be suppressed, e.g., it is an inappropriate PollCast for the particular community, and that number of responses exceeds an established threshold, then the user who initiated the broadcast message may be informed of the decision to suppress the broadcast of the message and the message may be terminated. In addition, the message and a user ID, or other identifying characteristics, such as network address, a cookie, or the like, for the user may be stored for later use in avoiding problems with the particular topic of the message and/or the user that sent the message.

Similarly, if the message is a PollCast, the responses to this PollCast may be received by the broadcast services server 820 via the response service server 870. The broadcast services server may use these responses to generate a real-time display for the client device 810 indicating the progress of the PollCast, such as the display 520 shown in FIG. 5. In addition, the broadcast services server 820 may determine if too few responses are received, e.g., a minimum number of responses is set for the PollCast and less than this minimum number is received. If less than the minimum number of responses is received, the message may be rebroadcast with a higher p value in order to increase the likelihood that a minimum number of responses will be received.

In one embodiment, the originator of the broadcast message, e.g., the user of client device 810, may be given the opportunity to terminate rebroadcast of the message to client devices 830-839. That is, the user of client device 810 may view the results of the PollCast or the responses to a SkillTap message to determine if an adequate response has been received. If so, the user may terminate the message. In this way, the user may continue rebroadcast of the message until an adequate response for the user is received. Additionally, the rebroadcast of the message may be automatically terminated once a predetermined number of responses have been received. The probability value p for the message may be set in the manner previously described or may be set by the originator with each rebroadcast of the message in order to give the originator of the message control over the size of the subset of users in the community to which the message will be displayed. Of course this originator set probability value p may be modified in accordance with system criteria in order to avoid the originator being able to continually send messages out that will be displayed on the majority of user's client devices, i.e. abuse the privilege of setting his/her own probability value p. For example, the number of consecutive times a user may be able to set his/her own p value may be limited.

In another embodiment of the present invention, a message that is to be broadcast to users of a community may be initially sent to a small subset of the users, e.g., monitors or trusted users, for their determination as to whether the message should be propagated to the entire community of users. If more than a predetermined number of these "special" users responds that the message is to be suppressed, then the message may be terminated before it is ever broadcast to any of the other users of the community. These "special" users may be periodically tested by sending of messages that contain inappropriate content for the community and determining how these "special" users respond.

Figure 9A:
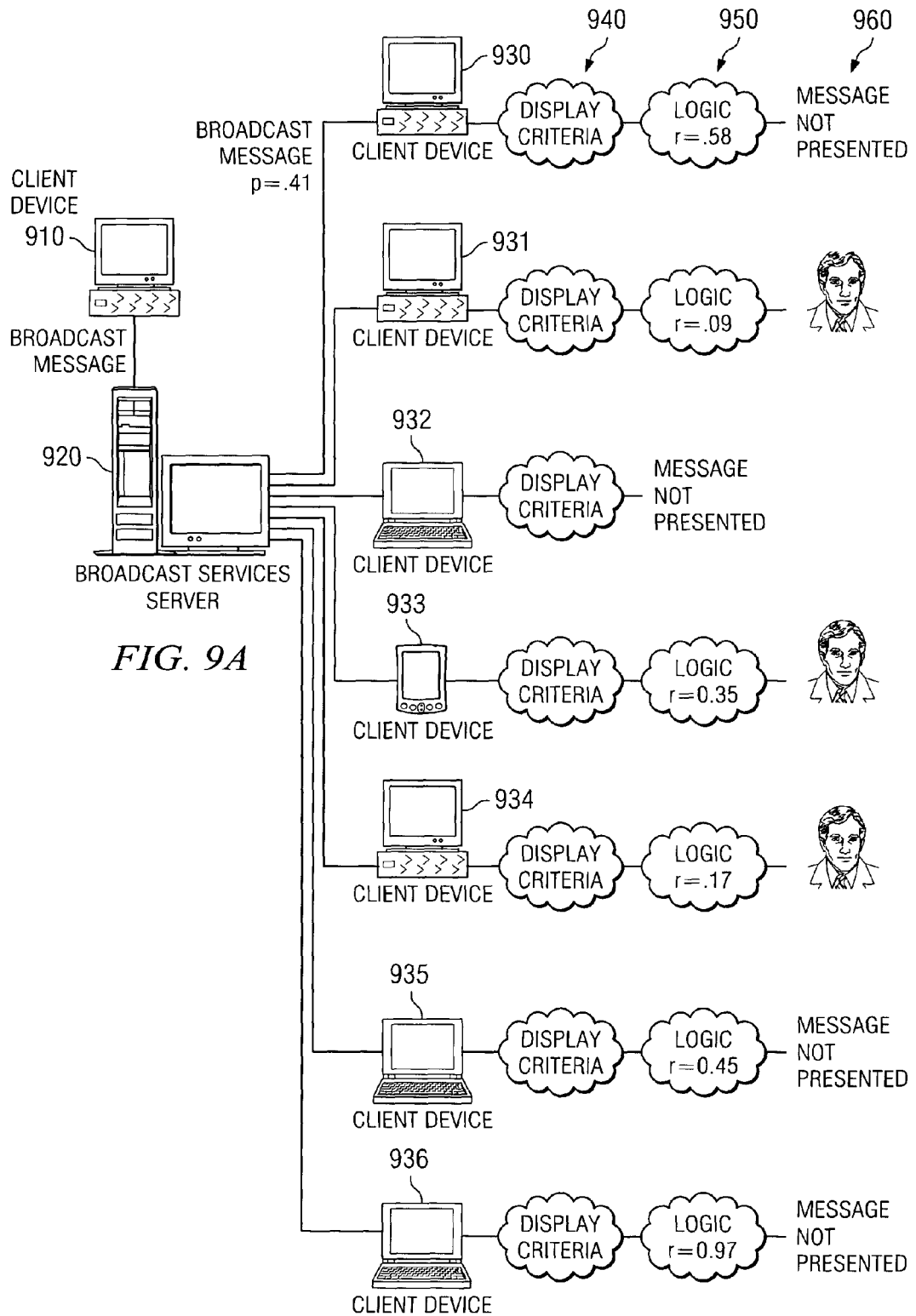
FIGS. 9A and 9B illustrate an initial broadcast and a rebroadcast of a message to a community of users in accordance with an exemplary embodiment of the present invention.
Figure 9B:
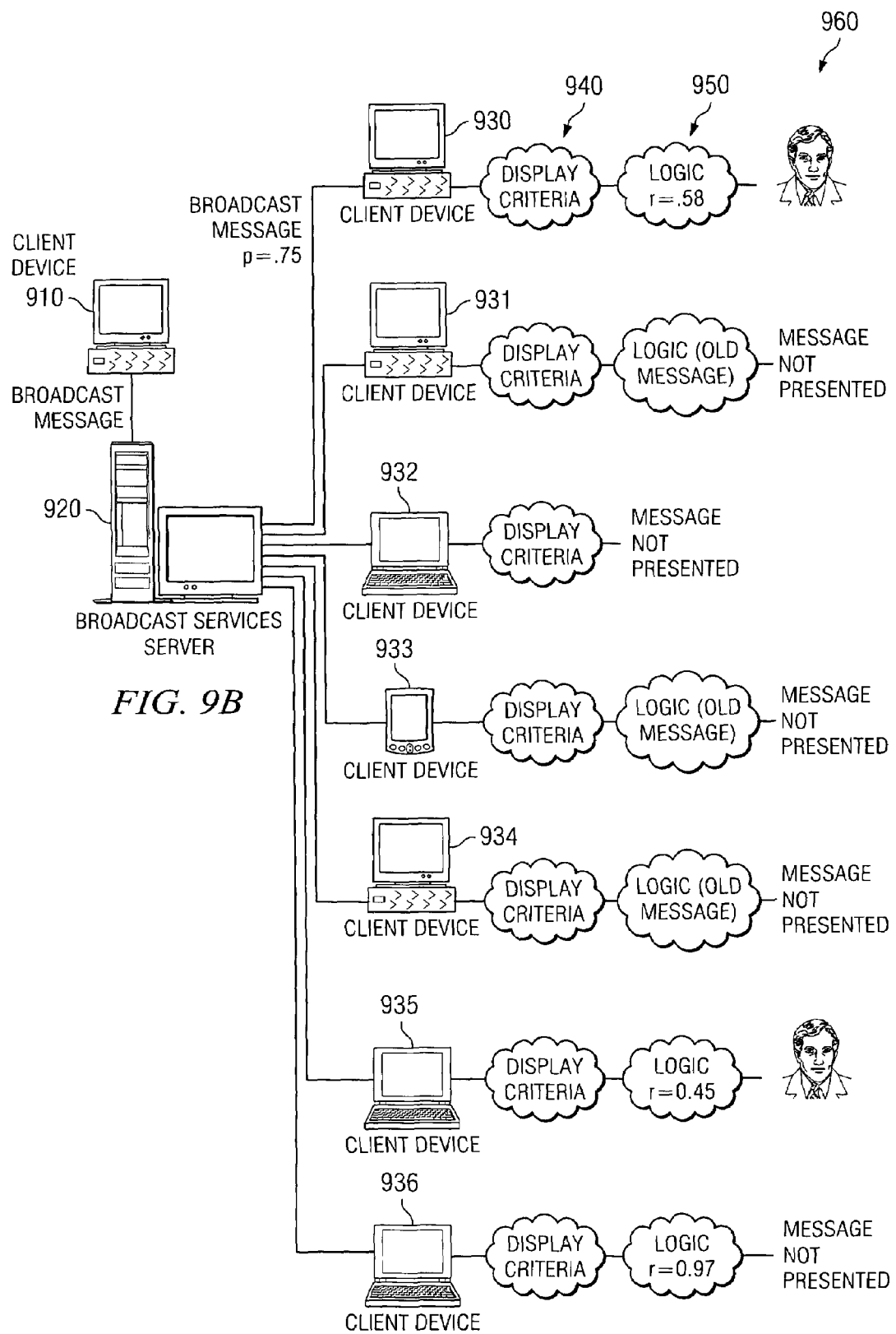

FIGS. 9A and 9B illustrate an initial broadcast and a rebroadcast of a message to a community of users in accordance with an exemplary embodiment of the present invention. As shown in FIG. 9A, the client device 910 sends a message for broadcast, e.g., a PollCast or a SkillTap, to the broadcast services server 920. The broadcast services server 920 applies broadcast logic to the message to determine which community to send the broadcast message to, the probability value p to be assigned to the broadcast message, the message ID to be assigned to the message, and other broadcast parameters. The broadcast services server 920 then stores a copy of the message along with the message ID, probability value p, and other parameters, in an associated storage device (not shown) for use in future rebroadcasts of the message. The message is then broadcast to the client devices 930-936 which apply their respective display criteria 940 to the parameters of the message to determine if the message is to be displayed on the client device.

As shown in FIG. 9A, the application of the display criteria to the message parameters for client device 932 results in a determination that the message does not meet the requirements of the display criteria 940 and thus, the message is not presented to the user. However, the message passes the display criteria for the other client devices 930-931 and 933-936. As a result, the logic 950 associated with the client devices 930-931 and 933-936 is applied to the message parameters to determine if the message is to be presented to the user.

The logic 950 first determines if the message ID for the received message is already in a session log for the client device. FIG. 9A assumes that this is the first broadcast of the message to the community of users and thus, none of the client devices 930-936 have a session log entry that matches the message ID for the broadcast message. An r value is then calculated at each of the client devices 930-931 and 933-936. As discussed above, the calculation of the r value may take many different forms including a simple random number generation or a more complex weighted calculation.

Once the r value for the client device is generated, the logic 950 compares the r value to the p value for the message. If the r value is greater than the p value, the message is not presented to the user, such as with client devices 930, 935 and 936. However, if the r value is less than or equal to the p value, the message is presented to the user in the form of an alert, such as with client devices 931, 933 and 934.

Referring now to FIG. 9B, it is assumed that during the first broadcast of the message shown in FIG. 9A, the responses received from the client devices 931, 933 and 934 did not satisfy a threshold requirement for satisfaction of the processing of the message, e.g., not enough users responded to the broadcast of the message or the question posed in the message was not answered satisfactorily according to an originator of the broadcast message. As can be seen in FIG. 9B, the message is then rebroadcast with a different p value, i.e., p=0.75, that will hopefully result in the type of response from the client devices 930-936 that the originator seeks.

The flow of the message through the client devices with regard to the display criteria is the same as discussed above with regard to FIG. 9A. Thus, client device 932 still does not present the message to the user of the client device. However, when the logic 950 is applied to the message parameters, a different result from that of FIG. 9A is achieved. As mentioned previously, the first check is to determine if a message ID for the currently received broadcast message is already present in a session log for the client device. Since this message has been previously broadcast, each of the client devices 930-936 will have stored a session log entry that indicates the message having been previously received and an indicator as to whether or not the message was displayed to the user of the client device. Thus, since the message was displayed to the users of client devices 931, 933 and 934, the check of the session log results in the message not being displayed again on these client devices. The message is discarded as a duplicate message at these client devices 931, 933 and 934.

The other client devices 930, 935 and 936 have a session log entry indicating the message was received previously but not displayed to the user. The session log entry further includes the r value that was previously calculated by the client device. As a result, the same r value is compared against the new p value for the rebroadcast of the message. The result of this comparison is that the r value for client device 930 and 935 is less than the new p value and thus, the message is displayed to the users of these client devices. The r value for the client device 936 is still greater than the new p value and thus, the message is not displayed to the user of this client device.

Thus, the present invention provides a mechanism for limiting the number of alerts seen by users of a client device by providing a two level check of the message parameters to determine if the message should be displayed to a user of a client device. The first level check involves communal filtering by determining if the message is directed to a community to which the client device subscribes and that the message does not contain content that has been indicated by the user as being content that should be suppressed. The second level check involves a randomization, or weighted randomization, of the display of the message on client devices based on characteristics of the message, the originator, and/or the client device that receives the message. This randomization may be modified during rebroadcasts of a message to achieve a larger or different set of users viewing the message.

The above embodiments describe the present invention in terms of a visual message that may be displayed via an alert that is generated on a display device of a client device, however the present invention is not limited to such. The messages and alerts may take other forms including audible messages and alerts, other types of visual messages and alerts, such as indicator lights, tactile messages, such a Braille messages, or the like.

In addition, while the preferred embodiments of the present invention have been described in terms of PollCast, SkillTap, and other aspects of the IBM Community Tools with Broadcast Suite tool, the present invention is not limited to such and any peer-to-peer network tool that provides for a one-to-many type of communication may make use of the mechanisms of the present invention without departing from the spirit and scope of the present invention.

Furthermore, while the above embodiments are described in terms of probability values p and r and the comparison of p and r being such that messages are displayed if the r value is less than or equal to the p value, these details are only intended to be exemplary and are not intended to imply any limitation on the present invention with regard to the types of pseudo-random values that may be used with the present invention or the criteria that may be used to determine whether to display a message at a client device. Thus, for example, rather than the r value needing to be equal to or less than the p value for the message to be displayed, an alternative embodiment may require that the r value be greater than the p value for the message to be displayed. Other modifications to the preferred embodiment described herein may be made without departing from the spirit and scope of the present invention.

Figure 11:
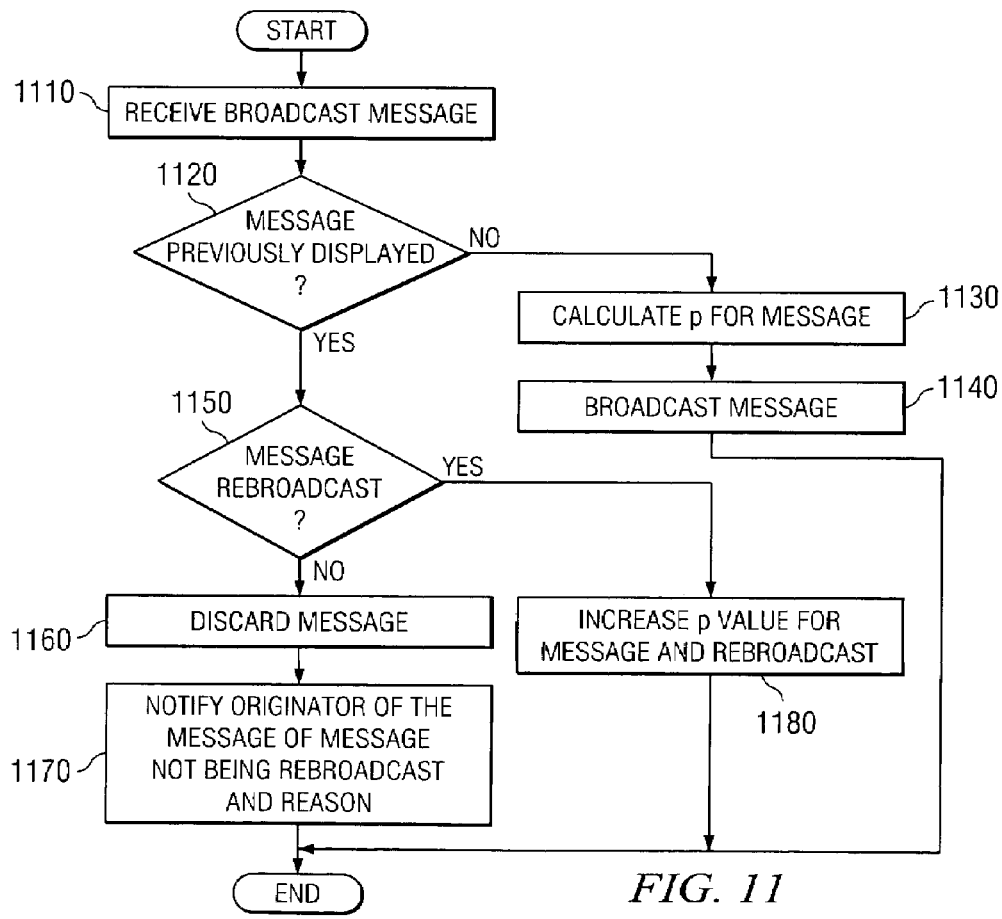
FIG. 11 is a flowchart outlining exemplary broadcast logic employed by a server for determining whether to re-broadcast a message according to one exemplary embodiment of the present invention.
Figure 10:
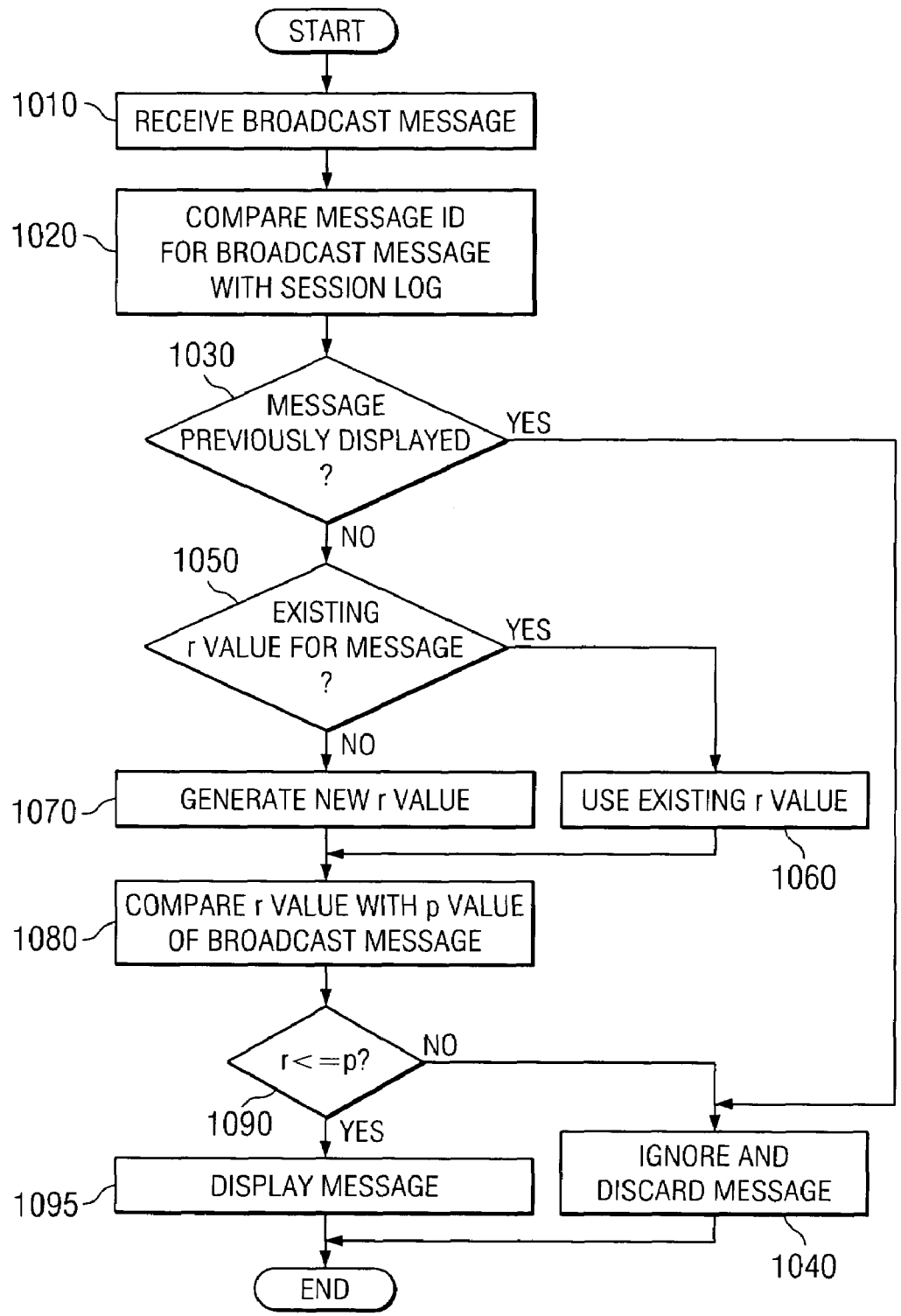
FIG. 10 is a flowchart outlining exemplary logic employed by the client devices to determine whether to display the message at the client device according to one exemplary embodiment of the present invention.

FIGS. 10 and 11 are flowcharts that illustrate exemplary logic employed by the client devices to determine whether to display the message at the client device (FIG. 10) and broadcast logic for determining whether to re-broadcast a message (FIG. 11) according to one exemplary embodiment of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 10, the operation for determining whether to display a received message at a client device starts by receiving a broadcast message having a unique message ID (step 1010). The message ID for the received message is compared against message IDs in a session log (step 1020) and a determination is made as to whether the message has been displayed (step 1030). If the message has been displayed, the message is ignored and discarded (step 1040). If the message has not already been displayed, a determination is made as to whether there is already an existing r value for the message (step 1050).

If there is an existing r value for this message, the existing r value is utilized (step 1060); otherwise, a new r value is generated (step 1070). The r value for the message is then compared against the p value of the message (step 1080) and a determination is made as to whether the r value is less than or equal to the p value (step 1090). If the r value is less than or equal to the p value, the message is displayed (step 1095). If the r value is greater than the p value, the message is ignored and discarded (step 1040). The operation then ends.

Turning now to FIG. 11, the operation for broadcasting a message in a broadcast services server starts by receiving a broadcast message with a unique ID (step 1110). A message log is checked to determine if the message has been previously broadcast (step 1120). If the unique message ID for the received message is not already present in the message log, a probability value p is calculated for the message (step 1130) and the message is broadcast (step 1140).

If the message has been previously broadcast, i.e., the message ID is already in the message log, then a determination is made as to whether the message should be rebroadcast (step 1150). This determination may be based on information received from the response service server and/or the originator of the broadcast message. If the message is not to be rebroadcast, the message is discarded (step 1160) and the originator of the message is provided with feedback that the message will not be rebroadcast and the reason why (step 1170). If the message is to be rebroadcast, the p value for the message is increased and the message is rebroadcast with the new p value (step 1180). The operation then ends.

Thus the present invention provides a logical peer-to-peer network in which the number of alerts or interruptions that a client device encounters due to messages sent from other client devices is significantly reduced by a two level filtering of received messages. Scalability of the number of client devices that display such a message is obtained through increasing the size of a sub-set of client devices that display the message with each rebroadcast of the message.

Since the present invention allows users to provide feedback regarding the appropriateness of a message and thereby limit the broadcasting of the message, only a relatively small subset of the users of a community will be exposed to the inappropriate message rather than the entire community. In addition, since the present invention allows an originator of a message to indicate whether the intent of the message is achieved, the present invention may limit the rebroadcast of the message to a larger subset of users in the community. Furthermore, statistical information from a smaller sample of users may be used to determine whether to rebroadcast a PollCast to a larger group of users within the community, e.g., if 500 persons have responded, it may not be necessary to ask another 5000 persons. Also, the rate at which messages are received and displayed on a client device may be used to adjust the probability that a message will be displayed on the client device so as to avoid message "storms."

The above embodiments of the present invention have been described in terms of the broadcast services server resending messages when it is determined that a sufficient response to a previous sending of the messages has not been received. However, the present invention is not limited to such. Rather, in an alternative embodiment of the present invention, the broadcast services server may send a message only once with the client devices themselves determining not only if they will display the message, but when the message will be displayed. That is, the message may be sent once by the broadcast services server with a probability associated with the message. At each client device, a determination may be made, such as based on a randomly generated number, as to whether the message is to be displayed. However, rather than discarding the message if it is not displayed, the message may be stored in a temporary storage of the client device if it is not displayed. At particular time intervals, the determination as to whether the message is to be displayed on the client device may be repeated by the client device without requiring the message to be resent by the broadcast services server.

For example, if when the message is received from the broadcast services server, the client device determines that the message is not to be displayed, the message and its associated probability may be stored in a temporary storage on the client device. The message may have an associated time interval at which repeated checks by the client device are to be made to determine whether the message is to be displayed on the client device. Alternatively, an exponentially growing time period may be used, e.g., a first time period from the first determination may be used to determine when a second check is to be performed, a second time period that is twice the length of time as the first time period may be used to determine when a third check is to be performed, a third time period that is four times the first time period may be used to determine when a fourth check is to be performed, and so on. Any manner of determining the elapsed time from the previous check of whether to display the message may be used without departing from the spirit and scope of the present invention.

Once it is determined that a required amount of time has elapsed since the last check of whether to display the message, the check of the randomized number against the probability may be repeated to determine whether to display the message at this new time. As discussed above, this subsequent check may involve modifying the probability, the randomized number, weights, or the like, to determine whether to display the message on the client device. If it is again determined that the message is not to be displayed, then the message may be retained in the temporary storage again for a subsequent check. The message may be retained in the temporary storage until either the message is displayed, the message times-out, or a subsequent message from the broadcast services server indicates that the message should be removed from temporary storage.

If at some point the broadcast services server determines that sufficient responses have been received for the message that was sent, the broadcast services server may transmit a message indicating that the display of the previous message should be discontinued. At this point, the client devices that have not already displayed the message will remove the message from their temporary storage and will discontinue checks to see if the message should be displayed on the client device.

Thus, with this alternative embodiment, rather than the broadcast services server having to repeatedly broadcast the message to the client devices when sufficient responses have not be received, the broadcast services server need only send the message once to each client device. In so doing, the amount of traffic in the network is lessened. That is, the traffic for one message in this alternative embodiment is comprised of the original broadcast of the message, any responses received from the client devices, and in some cases, a broadcast of a discontinue message, rather than multiple broadcasts of the message, responses received from the client devices, and a possible discontinue message broadcast.

The above embodiments are described in terms of a preferred embodiment in which probabilities and randomized values are used as a basis for determining whether to display a received message on a client device. However, the present invention is not limited to such embodiments. To the contrary, any mechanism that permits a subset of the client devices to display the message at a first iteration and then a second subset of client devices, which have not already displayed the message previously, to display the message at a second iteration, may be used without departing from the spirit and scope of the present invention. For example, the determination as to which client devices display the message at which times may be based on client device identifiers, user identifiers, and other device identifiers. For example, a network card, receiver, or other type of device, that is used to communicate over a network may have an associated identifier built into it, e.g., a Media Access Control (MAC) address, or the like. A bit mask may be used with this identifier to determine which identifiers are associated with client devices that should display the message. The bit mask may then be shifted such that a different subset of client devices that have not previously displayed the message may display it in subsequent iterations. Other mechanisms for obtaining a staggered display of messages on client devices and thus, a staggered response from the client devices, may be used without departing from the spirit and scope of the present invention.

The above embodiments have been described in terms of an instant messaging type of logical peer-to-peer messaging system. However, the present invention is not limited to such embodiments. Other applications of the present invention may be utilized without departing from the spirit and scope of the present invention. For example, the mechanisms of the present invention may be used with systems for displaying polls, messages, advertisements, etc. to viewers of television programs, such as in pop-up advertisements on interactive television systems. For example, a poll message associated with a particular television program may be transmitted to a subset of viewers of the television program via a WebTV device or the like, e.g., "Which Darren is better?" may be a poll question sent to viewers of the "Bewitched" television program. If a sufficient number of responses are received, the poll message may not be resent. However, if a sufficient number of responses are not received, the mechanisms of the present invention may be used to increase the size of the group of viewers that see the displayed poll message.

Another example of an alternative application of the present invention includes electronic mail broadcasts. The present invention may be utilized to send an electronic mail message to a group of client devices and then iteratively increase the size of the group of client devices based on responses to the previous sending of the electronic mail message. In short, any application in which communication is to be conducted between a single source and a group of recipients, such that iteratively increasing subsets of the group of recipients are to be contacted, may make use of the mechanisms of the present invention.

Moreover, while the above embodiments of the present invention have been described in terms of the responses from iterations of a broadcast of a message being used to determine whether to resend the message to a client device or a different client device, or re-evaluate whether to display the message on a client device, the present invention is not limited to such. In addition, in further embodiments, the responses that are received may be used to determine what additional messages are to be sent to the client devices. That is, based on a categorization of the responses that are received, a determination may be made regarding whether a related message should be sent the client devices or not.

For example, if a PollCast is sent and a plurality of client devices respond that the poll included in the PollCast is not appropriate, a related PollCast may not be sent to the client devices. Alternatively, if none of the client devices respond that the poll is inappropriate, a related PollCast may then be sent out to the client devices. Moreover, if a majority of responses select a particular option of the PollCast, e.g., a majority of client devices respond that the users would vote for Arnold Schwartzenegger for governor of California, then a related PollCast asking the users of the client devices what their favorite Arnold Schwartzenegger movie is may be sent out.

The number of applications and modifications to the preferred embodiments described herein are too numerous to describe in detail herein. However, as should be apparent to those of ordinary skill in the art, having read the present disclosure, the present invention is not limited to any particular embodiment. Rather, any embodiment in which the group of recipients of a communication is iteratively increased based on responses received from receiving the communication in a previous iteration, is intended to be within the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of scaling communication messages in a network of data processing systems, each one of the data processing systems capable of transmitting alert messages to any other one of the data processing systems, the method comprising:

transmitting an alert message, which requests a reply, from a source one of the data processing systems to a plurality of recipient ones of the data processing systems, the alert message being received by the plurality of recipient ones of the data processing systems;

outputting the alert message by only a first subset of the plurality of recipient ones of the data processing systems, the first subset being fewer than all of the plurality of recipient ones of the data processing systems;

receiving, by the source one of the data processing systems, reply messages transmitted from at least some of the first subset of the plurality of recipient ones of the data processing systems in response to a receipt of the alert message;

determining, by the source one of the data processing systems, if a predetermined number of reply messages has been received from the at least some of the first subset of the plurality of recipient ones of the data processing systems;

in response to determining that the predetermined number of reply messages has not been received, retransmitting the alert message to the plurality of recipient ones of the data processing systems, the retransmitted alert message being received by the plurality of recipient ones of the data processing systems;

outputting the retransmitted alert message by a second subset of the plurality of recipient ones of the data processing systems;

assigning a probability to the alert message; and determining, by each of the plurality of recipient ones of the data processing systems, whether to output the alert message based on the probability assigned to the alert message.

2. The method of claim 1, further comprising:

assigning a second probability to the retransmission of the alert message; and determining, by each of the plurality of recipient ones of the data processing systems, whether to output the retransmission of the alert message based on the second probability assigned to the retransmission of the alert message.

3. The method of claim 1, wherein the alert message is one of an instant message and an electronic mail message.

4. The method of claim 1, wherein the alert message is one of a PollCast and a SkillTap message.

5. The method of claim 1, further comprising within each recipient device:

storing the alert message in a storage device;

determining if a predetermined amount of time has elapsed since a previous determination was made about whether to output the alert message;

determining whether to output the alert message based on output criteria; and outputting the alert message if the output criteria is satisfied.

6. The method of claim 1, further comprising:

each of the plurality of recipient ones of the data processing systems determining whether to output the alert message by generating a randomized value and comparing the randomized value to the probability.

7. The method according to claim 1, further comprising the probability being determined using a random number generator.

8. The method according to claim 1, further comprising the probability being based on a total number of the plurality of recipient ones of the data processing systems.

9. The method according to claim 1, further comprising increasing the probability when the alert message is retransmitted.

10. A system for scaling communication messages in a network of communicating peer data processing systems, each one of the data processing systems capable of transmitting alert messages to any other of the data processing systems, comprising:

a source one of the data processing systems transmitting an alert message, which requests a reply, to a plurality of recipient ones of the data processing systems, the alert message being received by the plurality of recipient ones of the data processing systems;

only a first subset of the plurality of recipient ones of the data processing systems outputting the alert message, the first subset being fewer than all of the plurality of recipient ones of the data processing systems;

the source one of the data processing systems receiving reply messages transmitted from at least some of the first subset of the plurality of recipient ones of the data processing systems in response to a receipt of the alert message;

the source one of the data processing systems determining if a predetermined number of reply messages has been received from the at least some of the first subset of the plurality of recipient ones of the data processing systems;

in response to determining that the predetermined number of reply messages has not been received, the source one of the data processing systems retransmitting the alert message to the plurality of recipient ones of the data processing systems, the retransmitted alert message being received by the plurality of recipient ones of the data processing systems;

a second subset of the plurality of recipient ones of the data processing systems outputting the retransmitted alert message; and wherein the source one of the data processing systems server assigns a probability to the alert message, and wherein each of the plurality of recipient ones of the data processing systems determines whether to output the alert message based on the probability assigned to the alert message.

11. The system of claim 10, wherein the source one of the data processing systems assigns a second probability to the retransmission of the alert message; and determines whether to output the retransmission of the alert message based on the second probability assigned to the retransmission of the alert message.

12. The system of claim 10, wherein the alert message is one of an instant message and an electronic mail message.

13. The system of claim 10, wherein the alert message is one of a PollCast and a SkillTap message.

14. The system of claim 10, wherein each recipient one of the data processing systems stores the alert message in a temporary storage, determines if a predetermined amount of time has elapsed since a previous determination was made about whether to output the alert message, determines whether to output the alert message based on output criteria, and outputs the alert message if the output criteria is satisfied.

15. A method of distributing messages to a plurality of client devices in a network, comprising:

receiving a message for broadcast to a plurality of client devices;

assigning a probability value to the message;

transmitting the message to the plurality of client devices;

at each client device, generating a randomized value;

comparing the randomized value of a client device to the probability value of the message; and outputting the message based on the comparison of randomized value and the probability value.

* * * * *